(12) United States Patent
Jacob et al.

(10) Patent No.: US 10,380,365 B2
(45) Date of Patent: Aug. 13, 2019

(54) CHOREOGRAPHED DISTRIBUTED EXECUTION OF PROGRAMS

(71) Applicant: Chef Software, Inc., Seattle, WA (US)

(72) Inventors: Adam B. Jacob, San Francisco, CA (US); Julian C. Dunn, Brooklyn, NY (US); Jamie Winsor, Seattle, WA (US); Fletcher Nichol, Sherwood Park, CA (US); Alexandre Ethier, Mill Valley, CA (US); Nathan Smith, Oxford, IA (US); Ryan Keairns, Overland Park, KS (US); David Parfitt, Buffalo, NY (US); Joshua Timberman, Westminster, CO (US)

(73) Assignee: Chef Software, Inc., Seattle, WA (US)

( * ) Notice: Subject to any disclaimer, the term of this patent is extended or adjusted under 35 U.S.C. 154(b) by 437 days.

(21) Appl. No.: 15/170,767

(22) Filed: Jun. 1, 2016

(65) Prior Publication Data
US 2017/0351868 A1 Dec. 7, 2017

(51) Int. Cl.
*G06F 17/00* (2019.01)
*H04L 29/06* (2006.01)
(Continued)

(52) U.S. Cl.
CPC ............ *G06F 21/6218* (2013.01); *G06F 8/65* (2013.01); *G06F 9/45541* (2013.01); *G06F 21/602* (2013.01)

(58) Field of Classification Search
None
See application file for complete search history.

(56) References Cited

U.S. PATENT DOCUMENTS 6,286,041 B1    9/2001  Collins, III et al.
9,892,265 B1 *  2/2018  Tripathy ............... G06F 21/602
(Continued)

OTHER PUBLICATIONS

Srivastav, P., "The Swim Membership Protocol," retrieved on Feb. 16, 2016, from http://prakhar.me/articles/swim/, 5 pages.
(Continued)

*Primary Examiner* — Lynn D Feild
*Assistant Examiner* — Vadim Savenkov
(74) *Attorney, Agent, or Firm* — VLP Law Group LLP; James A. D. White

(57) ABSTRACT

Techniques are described for managing creation and/or execution of distributed programs, such as for a group of multiple interrelated programs that are part of a service-oriented architecture or that otherwise interact during execution to provide a desired type of functionality. In at least some situations, the described techniques include performing decentralized choreographed distributed execution of a group of related programs, by using executing supervisor components for some or all such programs to manage execution-related behavior of the programs. The execution-related behavior that is managed by supervisor components for a group of programs may include, for example, managing interactions between the programs, managing run-time dependencies and other relationships between at least some of the programs, managing update strategies for updating some or all of the programs of the group while the group continues to provide functionality (e.g., performing updates in a defined serial or simultaneous manner), etc.

26 Claims, 7 Drawing Sheets

(51) Int. Cl.
*G06F 21/62* (2013.01)
*G06F 8/65* (2018.01)
*G06F 21/60* (2013.01)
*G06F 9/455* (2018.01)

(56) References Cited

U.S. PATENT DOCUMENTS

| | | | |
|---|---|---|---|
| 2001/0029605 | A1 | 10/2001 | Forbes et al. |
| 2007/0168956 | A1 | 7/2007 | Moore et al. |
| 2009/0235245 | A1 | 9/2009 | Andersson |
| 2011/0131589 | A1* | 6/2011 | Beaty ............... G06F 9/5077 719/318 |
| 2011/0276951 | A1* | 11/2011 | Jain .................. G06F 11/3006 717/140 |
| 2014/0280799 | A1* | 9/2014 | Hendry ............. G06F 15/177 709/221 |
| 2016/0373291 | A1* | 12/2016 | Dornemann ......... H04L 67/28 |
| 2017/0212747 | A1* | 7/2017 | Austel ................. G06F 8/65 |

OTHER PUBLICATIONS

"Gossip Protocol," retrieved on Feb. 16, 2016, from https://www.serfdom.io/docs/internals/gossip.html, 3 pages.
"JBoss Enterprise Application Platform," retrieved on Feb. 16, 2016, from https://en.wikipedia.org/wiki/JBoss_Enterprise_Application_Platform, 4 pages.

\* cited by examiner

CHOREOGRAPHED DISTRIBUTED EXECUTION OF PROGRAMS

BACKGROUND

Software program development and deployment techniques have, in many cases, evolved from using traditional monolithic standalone software programs to instead using groups of interconnected smaller programs, with some or all such smaller programs referred to in some situations as "services" that are part of a larger service-oriented architecture in which multiple services work together to provide a larger coordinated functionality. While such service-oriented architectures provide some benefits, they also introduce a variety of complexities and other problems. One example of such complexities and problems involve coordinating the operation of multiple services so that they correctly provide their desired larger coordinated functionality, and one example of an attempt to address at least portions of such problems involves using a single centralized orchestration server to instruct and control execution of all of the services. However, such orchestration also creates various additional problems, and does not address all of the problems with such service-oriented architectures.

An additional type of functionality that provides some benefits but also creates increased complexity as well as other problems includes the use of virtualization techniques. For example, virtualization technologies such as those provided by XEN, VMWare, or User-Mode Linux may allow a single physical computing system to be shared among multiple users by providing each user with one or more virtual machines hosted by the single physical computing system, with each such virtual machine being a software simulation acting as a distinct logical computing system that provides users with the illusion that they are the sole operators and administrators of a given hardware computing resource, while also providing application isolation among the various virtual machines.

Another type of functionality that provides some benefits but also creates increased complexity and further problems includes the use of online execution environments that some companies provide to execute programs for and provide other benefits to customers, which may in some circumstances be referred to as providing platform as a service ("PaaS") functionality, software as a service ("SaaS") functionality, and/or infrastructure as a service ("IaaS") functionality, or more generally referred to at times as "cloud computing". Such an online execution environment typically operates computer networks that interconnect numerous computing systems to support their operations, such as with at least some of the computing systems being co-located in one or more data centers (whether private data centers that are operated by and on behalf of a single organization, or public data centers that are operated by entities as businesses for multiple customers). Some public data center operators provide network access, power, and secure installation facilities for hardware owned by various customers, while other public data center operators provide "full service" facilities that also include hardware resources made available for use by their customers.

However, as the use of service-oriented architectures, online execution environments and virtualization technologies has increased, solutions to address the resulting complexities and other problems have not been fully developed.

DETAILED DESCRIPTION

Figure 1:
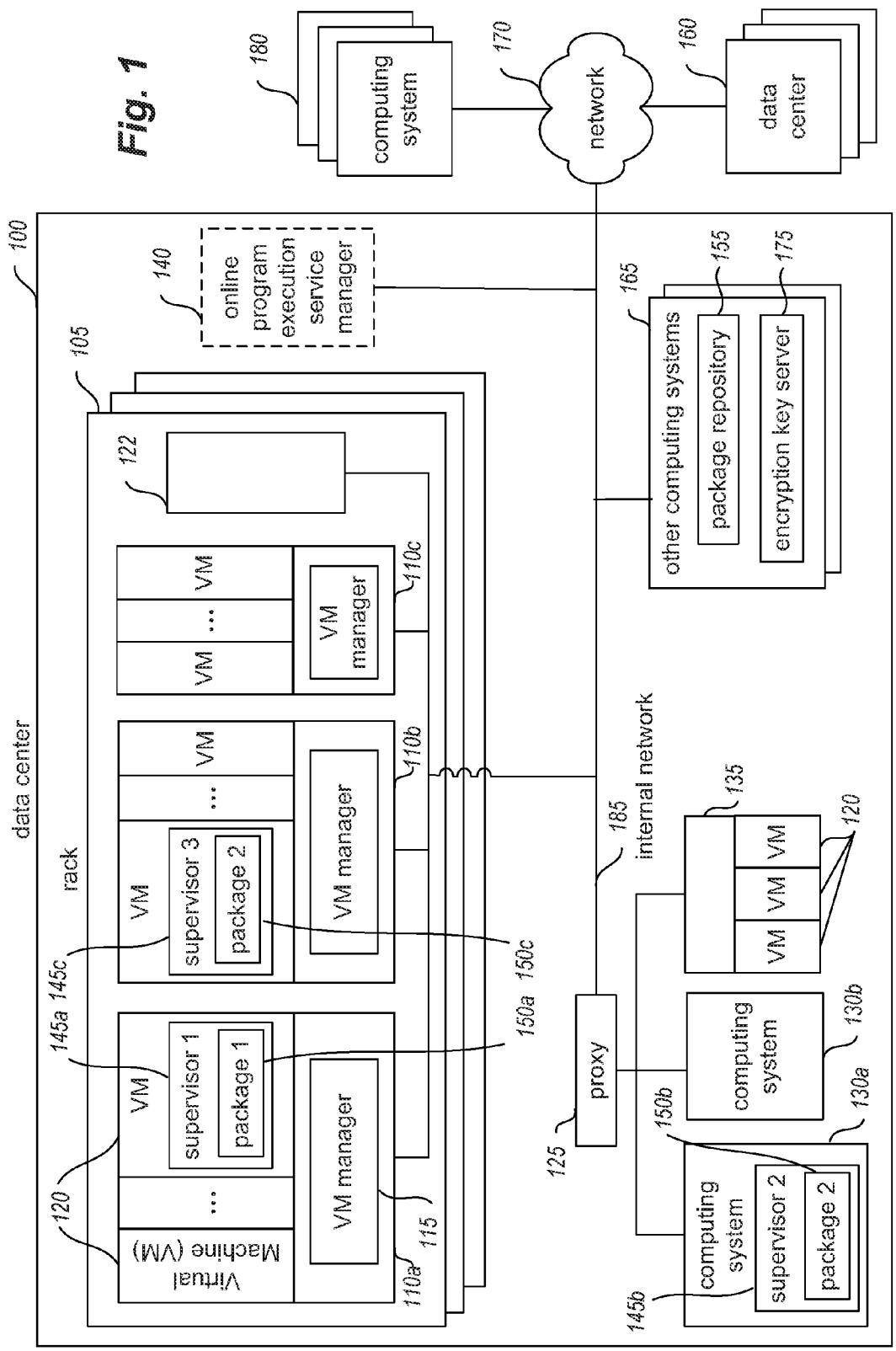
FIG. 1 is a network diagram illustrating an example embodiment of an environment in which multiple computing systems execute software programs in accordance with described techniques for performing decentralized choreographed distributed execution of programs.

Techniques are described for managing creation and/or execution of distributed programs, such as for a group of multiple interrelated programs that are part of a service-oriented architecture or that otherwise interact during execution to provide a desired type of functionality. In at least some embodiments, the described techniques include performing decentralized choreographed distributed execution of a group of related programs, by using executing supervisor components for some or all such programs to manage execution-related behavior of the programs. The execution-related behavior that is managed by supervisor components (also referred to at times herein as "supervisors") for a group of programs may include, for example, managing interactions between the programs, managing run-time dependencies and other relationships between at least some of the programs, managing update strategies for updating some or all of the programs of the group while the group continues to provide functionality (e.g., performing updates in a defined serial or simultaneous manner), etc. Additional details related to embodiments of such described techniques are included below, and at least some of the described techniques may be performed in some embodiments by automated operations of a Distributed Execution Choreography ("DEC") system, as discussed further below.

In at least some embodiments, the described techniques include automated operations of the DEC system to obtain one or more executable software programs of a customer, and to generate deployable software packages for use within the DEC system that include those software programs. For example, such a package may be designed and generated to operate within an executing supervisor component of the DEC system (e.g., a container) that manages interactions with the run-time execution environment in which the deployment occurs (as well as various execution-related behavior of the software programs), such that the package may be deployed in various run-time execution environments supported by the supervisor components without modifications to the package. Accordingly, once generated and deployed, a package acts as an executable artifact that removes or minimizes many of the complexities of the operating environment, including to abstract functions of the operating system, the supervisor managing the package, repositories of packages and/or of configuration information, networking details for communications between related programs, virtualization and an execution environment (e.g., host-level virtualization), particular program execution environments in which the execution occurs, etc.

In at least some embodiments, the DEC system supports various types of customer programs, including programs designed specifically to operate within the DEC system and/or legacy programs that are not designed based on the DEC system. As part of generating a package, the DEC system may use a builder component that receives not only the one or more underlying software programs to include within the package, but also other types of information that may include one or more of the following: default values for software configuration (e.g., to use in the absence of any different runtime-specified configuration parameters); customer callbacks (or 'hooks') for a supervisor to invoke when corresponding events occur for the software program execution; plug-ins from a customer to perform program-specific operations (e.g., with respect to monitoring, checking health or status, etc.), etc. In addition, a software program that is designed for use with the DEC system may further include a file in a designated format that provides instructions on how to build the package, while the builder component may instead receive interactive instructions for applications of other types from one or more users, so as to obtain such configuration information as the package is created. The generation of such a package may in at least some embodiments include wrapping the underlying program within code with which the supervisor component will interact during program execution, such that a supervisor component may load and execute any such generated package. During execution, a supervisor component that is executing a particular program as part of a local package within the supervisor may further monitor operations of the program, as discussed further below, as well as monitor any related separate configuration file for the package to detect any configuration changes that the supervisor then implements (e.g., by reloading or re-executing the package using changed configuration information, or if appropriate by upgrading the underlying program by using a new corresponding package for further execution).

Such generated packages may, in at least some embodiments, be atomic and immutable, such that a package does not change once it is generated, and is treated as a single object that is present or not present (e.g., does not have optional libraries or extensions or plug-ins that may or may not be present in a particular deployment). Thus, if a customer software program is modified after it is deployed as a package (e.g., a new version of the program is created), a new package would be created for the modified program, and optionally related to the original package). A generated package may further have, in at least some embodiments, attributes that include some or all of the following: an origin (e.g., to indicate a source of the underlying software program); a name (e.g., to allow other packages to refer to it); a version (e.g., to enable creation of multiple related packages that correspond to different versions of an underlying program); a release; one or more associated configuration files (e.g., to enable runtime configuration modifications); etc. When a package has a dependency on another package, the dependency may, for example, be expressed based on the release, or instead on other information that is unique to each package (e.g., a combination of name and version). In at least some embodiments, a package may further be encrypted or otherwise protected, as discussed in greater detail below.

Thus, a particular generated package that is executing may have dependencies on one or more other executing packages or package instances, whether in addition to or instead of a dependency on one or more configuration files. As one non-exclusive illustrative example, multiple copies (referred to herein at times as "instances") of the same package may be executed on different computing systems, such as to act as alternative providers of a given type of functionality implemented by the underlying program in the package. If so, dependencies may exist between the different instances for various reasons, such as if one of the multiple instances acts at a given time as a leader (or master) of the multiple related package instances that performs at least some types of functionality that the other instances do not (e.g., to handle some or all types of requests, such as to handle write requests to a database or other storage), while the other instances may act as followers to perform other types of functionality (e.g., to handle read requests for a database or other storage; to maintain copies of information about the leader, such as to enable them to act as hot swap backup copies; etc.). In order to manage such dependencies, the supervisor components for each of the package instances of the related packages may intercommunicate in various manners, including to elect and/or update a leader as appropriate (e.g., by using a voting protocol or other mechanism to select a leader at a given time), etc.

As another example, a particular package may be a producer and/or consumer of information or functionality with respect to one or more other packages, such that a package that is a consumer of information or functionality may have a dependency on other packages that provide such information or functionality. In at least some embodiments, when such a consumer package executes, if it is unable to currently identify a producer package that is providing the desired information and/or functionality, the consumer package may operate in a waiting state until such a producer package becomes available, or may instead act in other manners as specified by the programming of the consumer package. In at least some embodiments, dependencies are managed between multiple supervisor programs via a publish and subscribe techniques, in which a supervisor for a producer package may publish information about capabilities of the package and/or about information or other events that are produced, while a supervisor for a consumer package or other package may subscribe to such information or events about the producer package (or other package on which the consumer package has a dependency), so that the consumer package's supervisor component watches for desired information or functionality (e.g., receive notices when information and/or functionality from such producer packages, or other packages on which the local package has a dependency, change availability or are updated), and provides the corresponding information or functionality to the consumer package.

In at least some embodiments, the communications between the supervisor components to enable the dependencies and to otherwise provide communications between packages are performed in a decentralized manner using a gossip protocol, such as to create a mesh environment in which each supervisor component interacts with one or more other supervisor components, which in turn may interact with additional supervisor components, so that all of the supervisor components in a group of related programs are inter-connected (whether directly or via one or more intervening supervisor components). In such embodiments, messages passed between supervisor components (whether initiated by the supervisors or by the underlying packages of those supervisors) may be passed directly between those supervisor components if those supervisors are directly connected, or instead in some situations via one or more intervening supervisor components if a direct connection does not exist. Such gossip protocols not only assist in decentralized choreography of the multiple related programs, but also enable group healing and other updates as changes occur in the supervisor components and corresponding packages, such as to seamlessly incorporate new supervisor components and packages that begin to execute, and to accommodate when previous participation of a supervisor and underlying package in the group ends (e.g., due to an error or other failure of the program or underlying hardware, due to network communication failure that makes the supervisor component unavailable, etc.). One example of a gossip protocol that may be used in some embodiments is the SWIM (Scalable Weakly-consistent Infection-style Process Group Membership) protocol, such as within the Serf tool by HashiCorp—additional details are included in "SWIM: Scalable weakly-consistent infection-style process group membership protocol", by A. Das et al., in *Dependable Systems and Networks*, June 2002, which is hereby incorporated by reference in its entirety, and which is available at the time of this writing at http://www.cs.comell.edu/~asdas/research/dsn02-swim.pdf.

As noted above, the execution-related behavior that is managed by supervisor components may in some embodiments include a topology for a group of related packages or package instances in which each supervisor component or its local package plays a defined role for a topology that controls how the supervisor components interact with other supervisor components. Non-exclusive examples of such topologies include a stand-alone package whose operation is not dependent on other packages, a group of multiple packages or package instances that operate together in a leader/follower topology, etc. In at least some such embodiments, the DEC system may include multiple predefined topology types that a customer may merely select or indicate when creating a particular package, thus enabling the supervisor component to provide a variety of related types of functionality without the customer needing to specify the particular details. For example, if a leader/follower topology is specified for a group of multiple instances of a package, the corresponding group of supervisor components for those package instances may handle functionality to elect one or more of those package instances to operate in a leader role and to maintain such a leader role for the group, while other of the package instances operate in a follower role for the group, to implement functionality for handling external requests for a type of functionality provided by the multiple related program instances as appropriate (e.g., for the correct package instance to handle, such as based on whether it is a leader or a follower), etc.

As noted above, in at least some embodiments, the execution-related behavior that is managed by supervisor components for packages that are part of a group include managing update strategies for updating or otherwise modifying some or all of the programs of the group while the group continues to operate. Non-exclusive examples of update strategies include one or more of the following: stand-alone or stateless (e.g., such that a supervisor component can update its underlying local package at any time); one-at-a-time (e.g., such that the multiple programs of the group are coordinated, so that only a single supervisor at a time updates its underlying package—for example, a first supervisor to proceed may be elected or otherwise chosen, and it may notify one or more other supervisors when it is completed to enable a next supervisor to perform its update); by percentage (e.g., to enable a specified percentage of supervisor components to update their underlying local packages at the same time, such as to provide at least a minimum amount of other packages that are available and executing at any given time); based on topology (e.g., if a leader/follower topology is in use, to update the leader first and then the followers, or instead to update one or more of the followers first and then the leader); etc. In at least some such embodiments, the DEC system may provide multiple predefined types of update strategies that a customer may merely select or indicate when creating a particular package, thus enabling the supervisor component to provide a variety of related types of functionality without the customer needing to specify the particular details.

In addition, as previously noted, in at least some embodiments a supervisor component may monitor the health or other status of its underlying package, and may take various types of actions if problems are identified. Such health or status checks may include one or more default types of checks to perform (e.g., performing periodic pings or other interactions with the package to see if it responds, passively tracking how long it has been since the package performs a particular type of activity, etc.) and/or may include using customer-provided plug-ins that are specific to the program to check for particular types of program-specific functionality or information. In some embodiments, if the supervisor identifies a health problem, it may attempt to restart the package, or otherwise take action to address the problem (e.g., spawn a new supervisor to execute another instance of that package). In addition, the supervisor component may expose some or all such status information to other supervisor components, such as to enable other packages with dependencies on a given package to monitor its status and operate accordingly, as well as to use any customer-specified callbacks to provide information to a customer about health or status information of various types. Examples of such callbooks, or hooks, include a health check, callback on restart, callback on start, callback on new configuration, etc. Other supervisors may then watch a given supervisor to obtain information about the local package of that supervisor component that is being watched.

In some embodiments, various types of security-related functionality may be provided by the DEC system, including for the DEC system to provide a public key encryption server or other security server, or instead to provide access to such a security server from an external source. Various types of security-related policies may then be provided, including in some embodiments and situations to encrypt packages when they are stored and/or transferred, to encrypt communications between supervisor components, to encrypt any data that is stored by or generated by a package during execution, etc. In such embodiments, each supervisor component may receive information about the security server when it starts (or alternatively from other supervisor components during operation via the gossip protocol) as well as one or more such defined security policies to use, and may interact with the security server as appropriate to obtain keys or other security information to use as part of implementation of those security policies during operation.

The described techniques provide a variety of benefits, including greatly reducing or eliminating complexities of customers for executing programs, including for groups of programs using a service-oriented architecture, for programs using online execution services, and/or for programs using virtualization technologies. In at least some embodiments, the described techniques provide atomic, immutable packages that may be executed in various different types of runtime environments, with the executing packages including some or all of the following characteristics: being dynamically configurable at runtime; being topology aware and implementing it at runtime; being aware of a defined update strategy and implementing it at runtime; being aware of a defined security policy and implementing it at runtime;

performing health checks or other monitoring of a program and taking corresponding activities; exposing functionality of local packages being executed to others to enable dependencies to be watched and used; performing backups to persist the state of an executing program and/or its generated or stored data if so configured; etc.

For illustrative purposes, some embodiments are described below in which specific types of decentralized distributed choreographed program execution is provided in specific ways for specific types of programs executing on specific types of computing systems, such as for created packages executing within supervisor components of the DEC system. These examples are provided for illustrative purposes and are simplified for the sake of brevity, and the inventive techniques can be used in a wide variety of other situations, some of which are discussed below, and the techniques are not limited to use with virtual machines, a service-oriented architecture, data centers or other specific types of computing systems or computing system arrangements. For example, while at least some of the examples below are described with respect to a group of one or more inter-related packages that operate together, it will be appreciated that other types of programs may be used for one or more members of a group in at least some embodiments and situations.

Figure 2A:
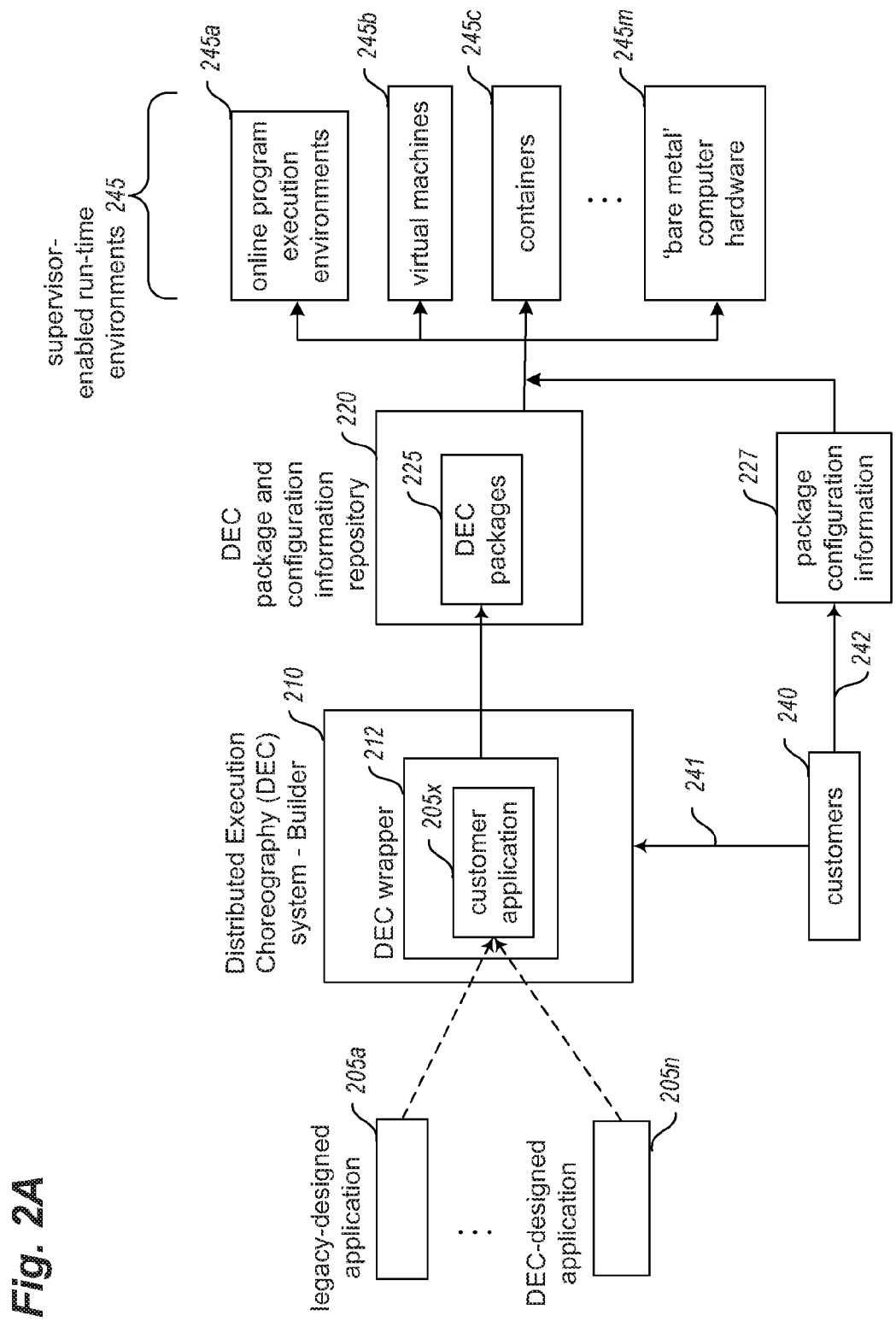
FIGS. 2A-2B illustrate examples of techniques for performing decentralized choreographed distributed execution of programs.
Figure 2B:
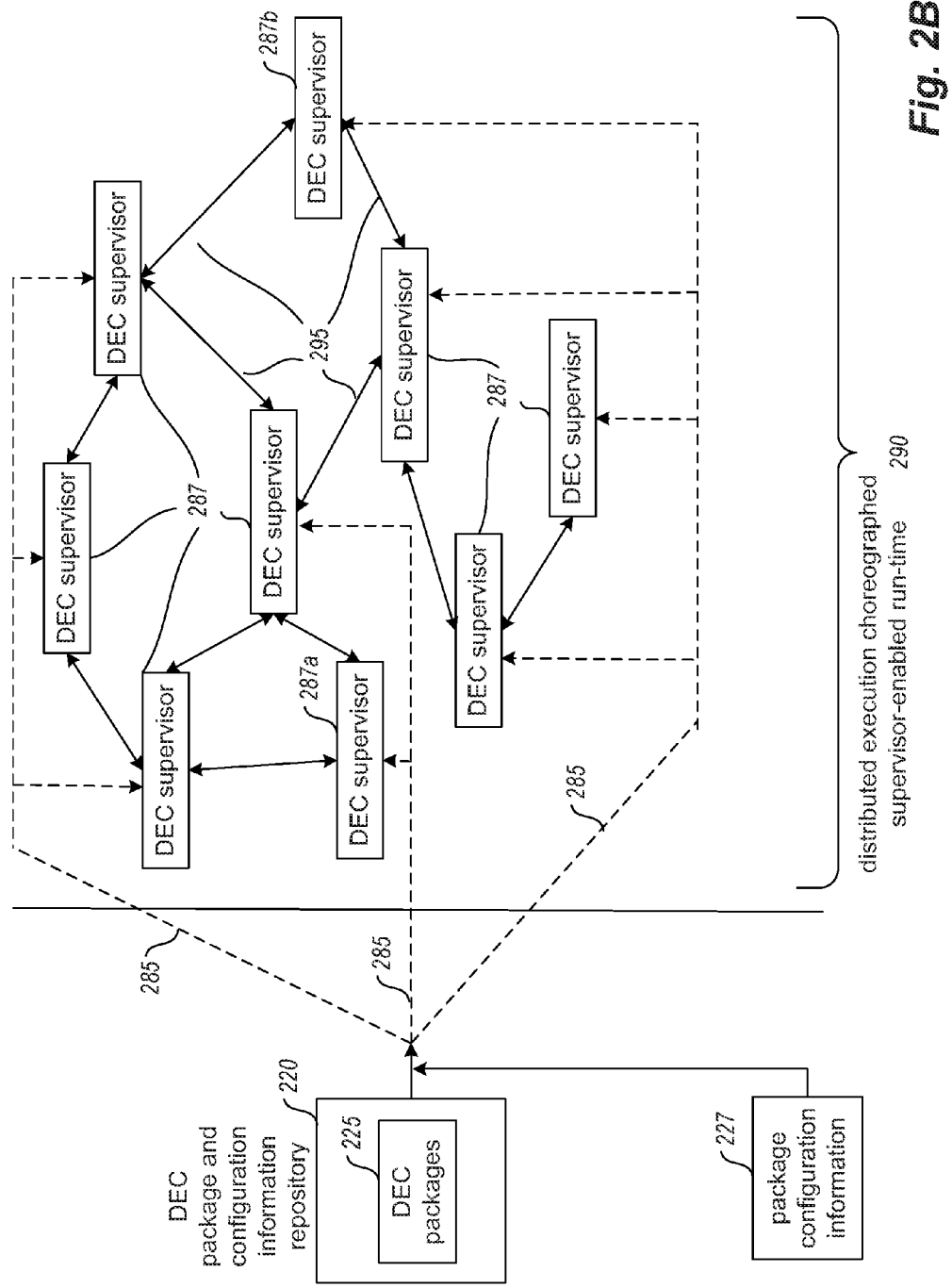

FIGS. 2A-2B illustrate examples of techniques for performing decentralized choreographed distributed execution of a group of related packages. In particular, FIG. 2A illustrates a high level overview of the process of creating and deploying one or more packages for use in such a group of related packages, and FIG. 2B illustrates additional details with respect to the deployment and decentralized choreographed distributed execution of such a group of one or more related packages.

With respect to FIG. 2A, a DEC system builder component 210 is illustrated for use by one or more customers 240 in creating deployable packages for use by DEC supervisor components, with the builder component being executed on one or more computing systems (not shown), such as on one or more computing systems of an online service or in another network-accessible location from which multiple remote customers may interact with the builder component, or instead for a particular customer to execute a copy of the builder component on one or more computing systems controlled by the customer. In the illustrated example, the builder component 210 receives instructions and other information from a customer 240 via interactions 241, including to specify a customer application 205x from which to generate a deployable package, along with various types of default configuration information (not shown) that is specified by the customer to be incorporated into a package to be created. Customer application 205x may, for example, be a legacy-designed application 205a that is designed to execute in a particular computing environment other than within the DEC system, or instead may be a DEC-designed application that is designed to execute within the DEC system. If the customer application 205x is a DEC-designed application 205n, the configuration information may be specified in some embodiments and situations in a standard format designated by the DEC system so that it is interpretable and usable by the builder component in an automated manner to generate the package without further customer input, while if the customer application 205x is a legacy-designed application 205a, the configuration information may instead be specified by the customer in other manners (e.g., interactively via manual specification). Alternatively, the builder component may in some embodiments and situations perform automated analysis of the customer application 205x to identify at least some such configuration information for use with the application (e.g., based on interfaces of the application that are exposed), and/or may use default configuration information if not otherwise specified by the customer.

In the illustrated embodiment, the builder component 210 performs automated operations to generate a package for the customer application 205x by creating and applying wrapper software 212 around the customer application 205x that will manage interactions with the customer application during execution (e.g., to manage interactions with a supervisor component in which the generated package is executed) in accordance with any specified default configuration information, as well as to optionally provide other functionality for the DEC system in some embodiments and situations, although in other embodiments and situations such wrapper software may not be used. While the builder component in the illustrated embodiment operates on a single customer application 205x at a single time, and includes a single application within a generated package in this example, it will be appreciated that the builder component may be consecutively used with multiple applications to create corresponding deployable packages, and in some embodiments and situations may simultaneously support multiple customer applications for one or more customers. In addition, in some embodiments a generated package may include more than one application, and/or a supervisor component may execute more than one generated package (whether simultaneously or in succession).

After the builder component 210 creates a deployable package from the customer application 205x, the builder component stores the resulting package 225 for that customer application, including any specified configuration information to use during execution. In the illustrated embodiment, the packages 225 are stored in a repository 220 provided by the DEC system, such as on one or more storage systems (not shown) controlled by an operator of the DEC system and/or in one or more execution environments in which the packages 225 may be deployed, although in other embodiments and situations some or all of the packages 225 may be stored in other manners, such as on storage systems of a customer, whether in addition to or instead of in a repository of the DEC system.

After the one or more packages have been generated for a group that is to provide a desired type of functionality, the DEC system may initiate the execution of the package(s) (optionally including multiple instances of at least one package) in one or more runtime environments 245 using supervisor components (not shown) of the DEC system to supervise and manage the decentralized choreographed distributed execution of those packages. In particular, in the illustrated embodiment, the run-time environments may include one or more of the following: one or more online program execution environments 245a; one or more virtual machines 245b; one or more virtualized containers 245c; one or more 'bare metal' (or 'bare machine') computer hardware systems 245m (e.g., on which one or more programs execute directly on the underlying hardware without an intervening operating system); etc. It will be appreciated that in some embodiments and situations, only a single execution environment may be used for multiple groups and/or customers, while in other embodiments and situations different execution environments may be used for different groups of related packages, and in yet other embodiments and situations, a particular group of related packages may be executed across multiple run-time environments. In addition, in at least some embodiments and situations, a particular customer 240 may optionally perform one or more additional interactions 242 to specify additional runtime configuration information 227 to use during the execution of one or more packages (e.g., one or more packages that the customer previously created, or instead another customer's package that is being executed on behalf of the particular customer), whether in addition to or instead of any default configuration information incorporated within the one or more packages, including to override any corresponding configuration information incorporated within the one or more packages if needed—if so, that additional configuration information 227 will be forwarded along to the run-time environments 245 as appropriate, as discussed further with respect to FIG. 2B.

FIG. 2B continues the example of FIG. 2A, and provides additional details related to the runtime management of a group of multiple related packages. In particular, FIG. 2B illustrates a particular runtime environment 290 that includes multiple supervisor components of the DEC system 287, with each supervisor component including one or more local packages (not shown) whose execution is being managed by the supervisor component on a corresponding computer system (not shown). FIG. 1 illustrates additional details with respect to one example runtime environment on which such execution could occur, as discussed in greater detail below. While not illustrated here, one or more supervisor components may be deployed without any local packages to manage in other embodiments and situations (e.g., to provide capabilities of the DEC system that are not specific to any particular package, such as for a group of related packages or for all packages). In the illustrated embodiment, the one or more packages 225 for the current group are distributed 285 to respective supervisor components 287 that each execute on a particular computing system (not shown), optionally along with any corresponding run-time configuration information 227, and with the supervisor component software loaded on the computing systems before the distribution in this example, although in other embodiments the supervisor components may be distributed together with their packages (e.g., included as part of the wrapper 212 around an underlying customer application 205*x* in some embodiments).

As the supervisor components 287 execute, they interact 295 with each other in order to provide functionality of the DEC system and to support the operations of the underlying packages in the supervisor components. For example, in the illustrated embodiment, the supervisor components interact in a decentralized choreographed distributed manner, without any centralized orchestration, such as by using a gossip protocol in which each supervisor component communicates with one or more other supervisor components but not necessarily all of the other supervisor components in a mesh fashion. As one example, supervisor component 287*a* communicates with two other supervisor components, but does not directly communicate with another supervisor component 287*b*, although information between supervisors 287*a* and 287*b* may nonetheless be communicated via one or more intervening supervisor components by use of the gossip protocol (e.g., to enable subscribe and publish functionality for one supervisor component to expose information about its local package and for other supervisor components to obtain that information as desired, including to enable dependencies between packages to be monitored as needed). One or more of the supervisors 287 may also monitor one or more corresponding stored files 225 for their local package in order to determine if a change has occurred, such as an update. In addition, if separate files (not shown) store the configuration information 227 that is used to manage a particular package that is deployed, such as to enable runtime configuration modification, one or more of the supervisors 287 may similarly monitor a corresponding configuration information file for their local package in order to determine when a change has occurred to the configuration information, such as to cause an update in the execution of the local package to use the changed configuration information.

It will be appreciated that the examples of FIGS. 2A-2B have been simplified for the purposes of explanation, and that the number and organization of supervisor components, packages, computer systems, etc. may be much larger than what is depicted. Similarly, in other embodiments, packages and other information may be stored and managed in other manners.

In addition, some embodiments may employ virtual machines or other virtualization technologies, and if so the programs to be executed by the program execution service may include entire virtual machine images. In such embodiments, an image program to be executed may comprise an entire operating system, a file system and/or other stored data, and possibly one or more user-level processes. In other embodiments, a program to be executed may comprise one or more other types of executables that interoperate to provide some functionality. In still other embodiments, a program to be executed may comprise a physical or logical collection of instructions and data that may be executed natively on the provided computing system or indirectly by means of interpreters or other software-implemented hardware abstractions. More generally, in some embodiments, a program to be executed may include one or more application programs, application frameworks, libraries, archives, class files, scripts, configuration files, data files, etc.

In some embodiments, some or all of the program execution may be performed by an online execution service (referred to at times herein as a program execution service) that manages execution of multiple programs on behalf of multiple users of the program execution service. In some embodiments, the program execution service may have groups of multiple co-located physical host computing systems in or more geographic locations, such as in one or more geographically distributed data centers, and may execute users' programs on those physical host computing systems. In such embodiments, customers or other users of the DEC system may also be users of the program execution service (e.g., customers of the program execution service who pay fees to use the program execution service), while in other embodiments, a single organization may provide at least some of both program execution service capabilities and capabilities of the DEC system (e.g., in an integrated manner, such as part of a single service), while in yet other embodiments the DEC system may be provided in environments that do not include or use a program execution service (e.g., internally to a business or other organization to support operations of the organization, such as by performing decentralized choreographed distributed execution of programs on computing systems provided by the organization).

In addition, the host computing systems on which programs execute may have various forms in various embodiments. At least some of the host computing systems may each include sufficient computing resources (e.g., volatile memory, CPU cycles or other CPU usage measure, network bandwidth, swap space, etc.) to execute multiple programs simultaneously, such as to each host multiple virtual machine computing nodes that are each capable of executing one or more programs on behalf of a distinct user, and with each such host computing system typically having an executing hypervisor manager or other virtual machine monitor manager that manages the virtual machines for that host computing system. In other embodiments or situations, some or all of the host computing systems may be physical computing systems that are not virtualized, whether running in a typical configuration with operating system software supporting other executing programs, or instead in a bare metal setup. In addition, multiple such host computing systems may, for example, be co-located in a physical location (e.g., a data center).

In some embodiments, the DEC system may provide one or more APIs ("application programming interfaces") for use by its users, such as to allow other programs to programmatically initiate various types of operations to be performed (e.g., as directed by users of the other programs). Such operations may allow some or all of the previously described types of functionality to be invoked, such as by computing systems of customers or other users, by supervisor components that are executing software for the DEC system, etc. In other embodiments, the DEC system may provide one or more GUIs ("graphical user interfaces") or other user interfaces (e.g., a command-line interface) to access functionality corresponding to some or all of the described techniques, whether in addition to or instead of the APIs. Furthermore, access to some or all of the described techniques may in some embodiments be provided in a fee-based or other paid manner to at least some users. For example, users may pay one-time fees, periodic (e.g., monthly) fees and/or one or more types of usage-based fees to use functionality of the DEC system, and fees may be based on various factors and activities.

FIG. 1 is a network diagram illustrating an example execution environment in which multiple computing systems may provide execution capabilities, such as under the control of a DEC system and/or a separate program execution service—as one non-exclusive example, the example execution environment of FIG. 1 may be used as some or all of the run-time environment 290 discussed in FIG. 2B. In particular, in this example, programs are executed on various host computing systems located within a data center 100, such as under control of optional manager software 140 of a program execution service that manages the data center, although in other embodiments some or all of the host computing systems in use may instead be operated by the DEC system or by a customer of the DEC system.

In this example, data center 100 includes a number of racks 105, and each rack includes a number of host computing systems, as well as an optional rack support computing system 122 in this example embodiment. The host computing systems 110a-c on the illustrated rack 105 each host one or more virtual machines 120 in this example, as well as a distinct virtual machine manager module 115 (e.g., a hypervisor) associated with the virtual machines on that host computing system to manage those virtual machines. One or more other host computing systems 135 also each host one or more virtual machines 120 in this example. Each virtual machine 120 may act as an independent computing node for executing one or more program copies for a user (not shown), such as a customer of the program execution service and/or of the DEC system. In addition, this example data center 100 further includes additional host computing systems 130a-b that do not include distinct virtual machines, but may nonetheless each act as a computing node for one or more programs being executed for a user. In this example, a proxy 125 (e.g., executing on a computing system, not shown) is distinct from but associated with the host computing systems 130a-b and 135 to manage communications for the computing nodes provided by those host computing systems. The rack support computing system 122 may provide various utility services for other computing systems local to its rack 105 (e.g., long-term program storage, metering and other monitoring of program execution, etc.), as well as possibly to other computing systems located in the data center. Each computing system 110, 130 and 135 may also have one or more local attached storage devices (not shown), such as to store local copies of programs and/or data created by or otherwise used by the executing programs, as well as various other components.

In this example, an optional computing system 140 is also illustrated that executes a manager component for the program execution service to assist in managing the execution of programs on the computing nodes provided by the host computing systems located within the data center (or optionally on computing systems located in one or more other data centers 160, or other remote computing systems 180 external to the data center). As discussed in greater detail elsewhere, such a manager component may provide a variety of services for the program execution service, including the management of user accounts (e.g., creation, deletion, billing, etc.); the registration, storage, and distribution of programs to be executed; the collection and processing of performance and auditing data related to the execution of programs; the obtaining of payment from customers or other users for the execution of programs; etc.

This example data center 100 also includes one or more other computing systems 165 that provide functionality of a public key encryption security server 175 for the DEC system to assist in providing security-related functionality for executing supervisor components of the DEC system, and that provide storage in this example embodiment for a repository 155 of packages to be deployed, with some or all of those packages including configuration information (not shown) for use by those packages that was specified during package creation. In other embodiments, different computing systems may be used to provide the package repository 155 and the encryption key server 175, or instead one or both of these components may not be provided and used. In this example, the various host computing systems 110, 130 and 135, and additional systems 125, 140 and 165 are interconnected via one or more internal networks 185 of the data center, which may include various networking devices (e.g., routers, switches, gateways, etc.) that are not shown. In addition, the internal networks 185 are connected to an external network 170 (e.g., the Internet or other public network) in this example, and the data center 100 may further include one or more optional devices (not shown) at the interconnect between the data center 100 and an external network 170 (e.g., network proxies, load balancers, network address translation devices, etc.). In this example, the data center 100 is connected via the external network 170 to one or more other data centers 160 that each may include some or all of the computing systems and storage systems illustrated with respect to data center 100, as well as other remote computing systems 180 external to the data center. The other computing systems 180 may be operated by various parties for various purposes, such as by the operator of the data center 100 or third parties (e.g., by the DEC system, by customers of the program execution service and/or of the DEC system, etc.).

In this example, a group of at least three package instances has been deployed by the DEC system (or by a customer of the DEC system) within the data center, including supervisor component 1 145a that is executing an instance 150*a* of package 1 on a virtual machine 120 of host computing system 110*a*, supervisor component 2 145*b* that is executing a first instance 150*b* of package 2 on a standalone host computing system 130*a* (whether using operating system capabilities, not shown, of the computing system 130*a*, or instead in a bare metal configuration), and supervisor component 3 145*c* that is executing a second instance 150*c* of package 2 on a virtual machine on host computing system 110*b*. It will be appreciated that numerous additional packages may be executed as part of some groups, while in other situations a group may include one or more instances of a single package. The supervisor components 145 may perform various automated operations to manage the execution-related behavior of the package instances 150 as discussed in greater detail elsewhere herein, including to intercommunicate via network 185 and/or other communication mechanisms (not shown) within the data center, such as a rack-level connection between host computing systems 110*a* and 110*b*.

It will also be appreciated that the example of FIG. 1 has been simplified for the purposes of explanation, and that the number and organization of host computing systems and other devices may be much larger than what is depicted in FIG. 1 in some situations. In addition, other details of FIG. 1 have also been simplified for the purposes of explanation, and that the number and organization of supervisor components, packages, computer systems, etc. may be much larger than what is depicted, while some depicted systems (e.g., other computing systems 165) may be located outside the data center and/or may not be used at all.

Figure 3:
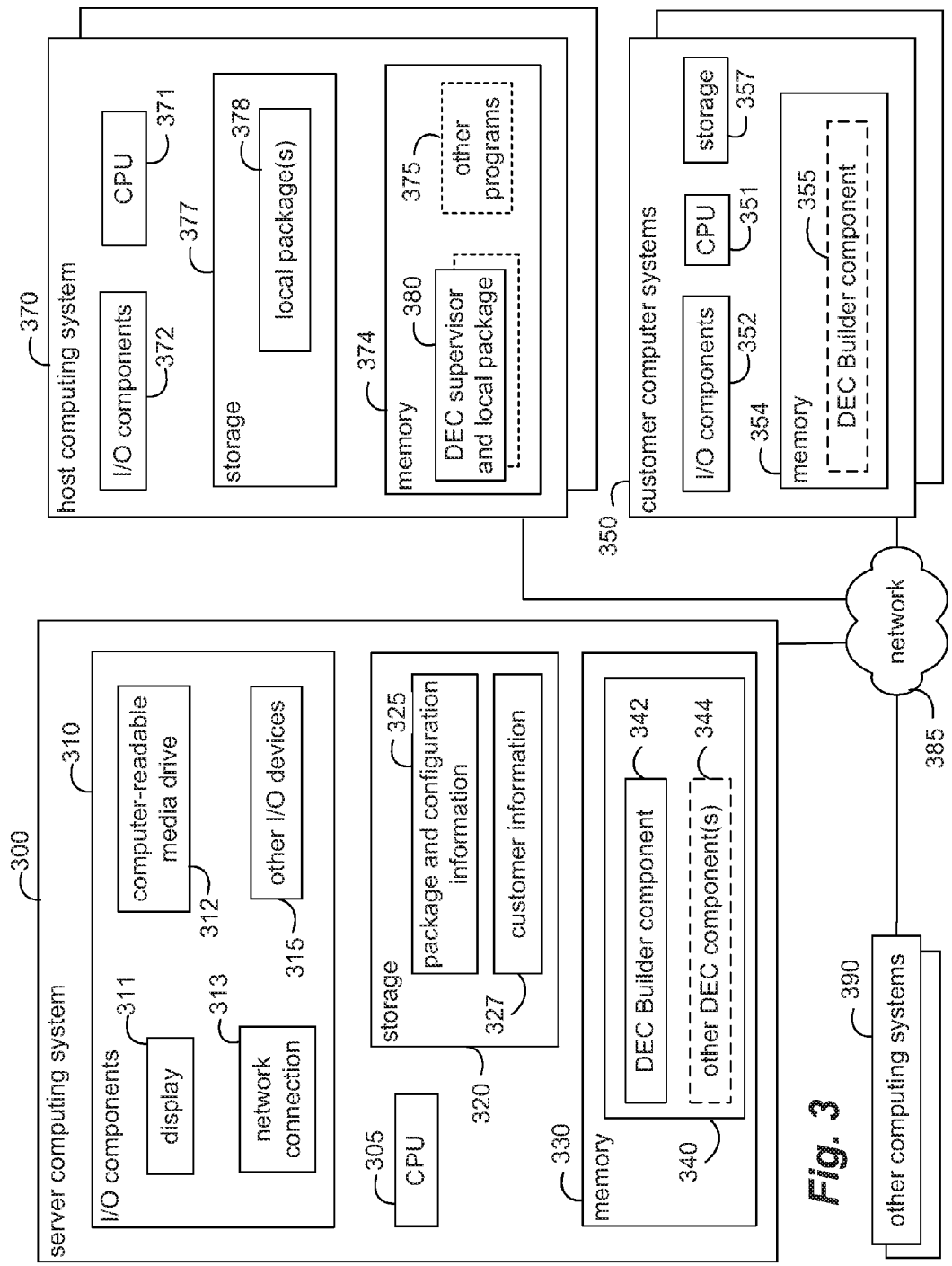
FIG. 3 is a block diagram illustrating example computing systems suitable for providing a Distributed Execution Choreography ("DEC") system and/or service for performing decentralized choreographed distributed execution of programs.

FIG. 3 is a block diagram illustrating example computing systems suitable for managing execution of an embodiment of the DEC system, including generating deployable packages and performing decentralized choreographed distributed execution of programs, as discussed briefly with respect to FIG. 3, and in greater detail elsewhere herein. In this example, a server computing system 300 executes an embodiment of a DEC System 340 to manage performing decentralized choreographed distributed execution of programs on at least some other host computing systems 370 and/or other computing systems 390, such as based on instructions received from customers using customer computer systems 350, and with interactions between the systems 300, 350, 370 and 390 occurring in this example over one or more networks 385 (e.g., an internal network of a data center, not shown, that includes some or all of the computing systems 300, 360, 370, and 390).

In this example embodiment, computing system 300 includes one or more hardware CPU ("central processing unit") processors 305, local storage 320, memory 330, and various I/O ("input/output") components 310, with the illustrated I/O components in this example including a display 311, a network connection 312, a computer-readable media drive 313, and other I/O devices 315 (e.g., a keyboard, mouse, speakers, microphone, etc.). In the illustrated embodiment, the DEC System 340 is executing in memory 330, and may include one or more builder components 342 and/or one or more optional other DEC components 344. In addition, the storage 320 provides storage for the DEC system that includes a repository or other storage for package and configuration information 325 and customer information 327, although some or all such information may instead be stored in other locations in other embodiments. The other systems 350, 370 and 390 may each similarly include hardware processors (e.g., one or more CPUs 371 of each system 370, one or more CPUs 351 of each system 350, one or more CPUs of each other system 390, etc.), storage (e.g., storage 377 of each system 370, storage 357 of each system 350, other storage of each other system 390, etc.), memory (e.g., memory 374 of each system 370, memory 354 of each system 350, other memory of each other system 390, etc.) and I/O components (e.g., I/O components 372 of system 370, I/O components 352 of system 350, other I/O components of other systems 390, etc.), although less details are illustrated for the other systems in this example for the sake of brevity.

Each of the host computing systems 370 in this example may execute one or more DEC supervisor components 380 and included local packages, such as on one or more virtual machines (not shown) on the host computing system, or instead in a non-virtualized manner on the host computing system, and may provide local storage 377 to store local packages 378 and/or associated configuration information (not shown) or other data (not shown) that is used or generated by the executing local packages 380. Each computing system 370 similarly includes a CPU 371, local storage 377, memory 374, and various I/O components 372 (e.g., I/O components similar to I/O components 310 of server computing system 300). Other programs may additionally be executed in memory, and other programs and/or data may additionally be stored on storage.

Each customer computer system 350 in this example includes a CPU 351, local storage 357, memory 354, and various I/O components 352 (e.g., I/O components similar to I/O components 310 of server computing system 300). In the illustrated embodiment, a copy of a DEC builder component 355 may optionally be executing in memory 354, whether in addition to or instead of component 342 of system 300, such as to allow a customer operating the system 350 to generate deployable packages for applications of the customer. In other embodiments, the memory 354 may instead include an executing component (e.g., a browser program, a client-side component specific to the DEC system, etc.) that communicates over network 385 with component 342 of system 300 to obtain such functionality, and/or over network 385 with host computing systems 370 to deploy and/or monitor executing packages 380. In addition, while not illustrated here, in some embodiments various information about packages that are generated for the customer by components 342 or 355 may be maintained on storage 357 or elsewhere.

The other computing systems 390 may further include other proximate or remote computing systems of various types in at least some embodiments, including one or more security servers, storage repositories, etc.

It will be appreciated that the illustrated systems are merely illustrative and are not intended to limit the scope of the present invention. For example, systems 300, 350, 360, 370 and/or 390 may be connected to other devices that are not illustrated, including through network 385 and/or one or more other networks, such as the Internet or via the World Wide Web ("Web"). More generally, a "client" or "server" computing system or device may comprise any combination of hardware that can interact and perform the described types of functionality, such as when programmed or otherwise configured with software, including without limitation desktop computers, laptop computers, slate computers, tablet computers, embedded computers, specialized hardware such as ASICs or other computers, smart phone computing devices and other cell phones, Internet appliances, PDAs and other electronic organizers, database servers, network storage devices and other network devices, wireless phones, pagers, television-based systems (e.g., using set-top boxes and/or personal/digital video recorders and/or game consoles and/or media servers), and various other consumer products that include appropriate inter-communication capabilities. For example, the illustrated system 340 and/or its components may include executable software instructions and/or data structures in at least some embodiments, which when loaded on and/or executed by particular computing systems or devices may be used to program or otherwise configure those systems or devices, such as to configure processors of those systems or devices. Alternatively, in other embodiments, some or all of the software components and/or systems may execute in memory on another device and communicate with the illustrated computing system/device via inter-computer communication. In addition, while various items are illustrated as being stored in memory or on storage at various times (e.g., while being used), these items or portions of them can be transferred between memory and storage and/or between storage devices (e.g., at different locations) for purposes of memory management and/or data integrity. Furthermore, the functionality provided by the illustrated system components may in some embodiments be combined in fewer components or distributed in additional components. Similarly, in some embodiments the functionality of some of the illustrated components may not be provided and/or other additional functionality may be available.

Thus, in at least some embodiments, the illustrated components and/or systems are software-based components/systems including software instructions that, when executed by the CPU(s) 305, CPU(s) 371 and/or CPU(s) 351 and/or other processor means, program the processor(s) to automatically perform the described operations for that component/system. Furthermore, in some embodiments, some or all of the components and/or systems may be implemented or provided in other manners, such as at least partially in firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, components or data structures may also be stored (e.g., as software instructions contents or structured data contents) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
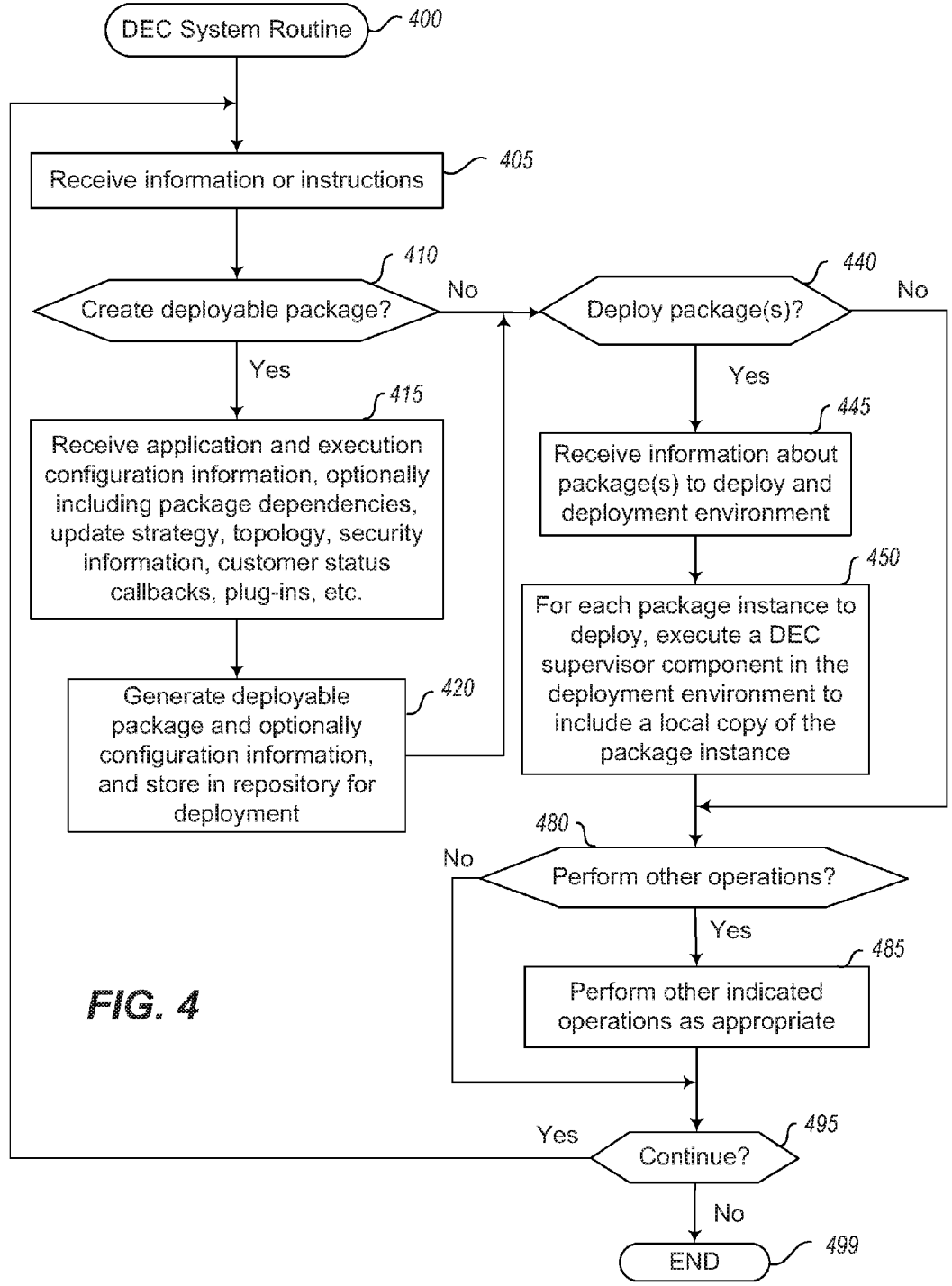
FIG. 4 illustrates a flow diagram of an example embodiment of a DEC System routine.

FIG. 4 illustrates a flow diagram of an example embodiment of a Distributed Execution Choreography (DEC) System routine 400. The routine may be provided by, for example, execution of the DEC system 340 and other DEC components 355 and 380 of FIG. 3, the DEC components 210 and 287 of FIGS. 2A-2B, and/or the DEC components 145 of FIG. 1, such as to provide a DEC system for use in generating deployable packages and performing the centralized choreographed distributed execution of programs. In the illustrated embodiment, functionality of the routine may be performed by different components of the DEC system in at least some embodiments, such as to use a builder component to create deployable packages and to use DEC supervisor components to deploy and manage runtime execution of created packages, although in other embodiments other components may be used, whether in addition to or instead of the illustrated type of components, or instead DEC system functionality may be implemented without such components.

The illustrated embodiment of the routine begins at block 405, where information or instructions are received. The routine then continues to block 410 to determine if the instructions in block 405 are to create a new deployable package, such as for a customer. If so, the routine continues to block 415 to receive the application to be deployed along with various other configuration information related to the execution. As discussed in greater detail elsewhere, the application may be of various forms, including a legacy application that was designed to execute in other environments not specific to the DEC system (e.g., to execute directly in a particular operating system or other execution environment), an application designed specifically for use within the DEC system, etc. Non-exclusive examples of types of execution configuration information that may be received include information about dependencies of the package on one or more other packages (e.g., as part of a group of related packages to execute together), an update strategy to use for the package (e.g., selected from multiple predefined update strategies provided by the DEC system), a topology to use with the package and other copies or instances of the same package or other related packages (e.g., from multiple predefined topology types provided by the DEC system), security information to use for the package (e.g., encryption keys and/or types of encryption to use for the package itself and/or for communications with other packages or as is otherwise specified), customer status callbacks for the customer to receive information via the callbacks of specified types when specified events or circumstances occur during execution of the package, plug-ins related to modifying default behavior (e.g., related to monitoring, health checks, etc.), etc. It will be appreciated that the interactions indicated with respect to block 415 may occur in various manners in various embodiments, including via a series or sequence of interactive steps performed by one or more users of the customer in one or more sessions, via one or more API calls performed by one or more such users, etc.

After block 415, the routine continues to block 420 to generate a deployable package based on the information received in block 415 and optionally any configuration information received, as well as any default settings of the DEC system that are not changed by any such configuration information (e.g., defaults for all customers, customer-specific preferences that were previously specified, etc.). After the deployable package is generated, it is stored in a DEC repository (or other indicated customer repository) for subsequent deployment.

After block 420, or if it was instead determined in block 410 that the information or instructions received in block 405 were not to create a deployable package, the routine continues to block 440 to determine whether the information or instructions received in block 405 are to deploy one or more packages or package instances. If so, the routine continues to block 445 to receive information about the one or more packages to deploy, optionally with a quantity of instances of each such package, as well as a deployment environment in which to deploy the package (if not otherwise specified previously). After block 445, the routine continues to block 450 to, for each package instance to deploy, initiate the execution of a DEC supervisor component in the deployment environment in a manner that will include an executing local copy of the package instance.

After block 450, or if it is instead determined in block 440 that the instructions received in block 405 were not to deploy one or more such packages, the routine continues to block 480 to determine whether the information or instructions in block 405 indicate any other operations to be performed. If so, the routine continues to block 485 to perform one or more other such indicated operations as appropriate. Non-exclusive examples of such other operations include other interactions by customers with a DEC system (e.g., to register with the system, to specify preferences, to check the status of currently executed programs or previously executed programs, to provide payment or other administrative information, etc.), to provide functionality related to security (e.g., to implement operation of a public key encryption server to provide and/or validate encryption keys to customers and/or supervisors components as appropriate), to receive and store (or otherwise handle) errors or other status information from supervisor components and/or builder components, modifying configuration information for previously created deployable packages, doing updates to previously created deployable packages (e.g., to deploy a new version as part of a related new package), etc.

After block 485, or if it is instead determined in block 480 not to perform any other indicated operations, the routine continues to block 495, where it determines whether to continue, such as until such an explicit indication to terminate is received. If it is determined to continue, the routine returns to block 405 and waits for additional information or instructions, or instead proceeds to block 499 and ends.

Figure 5A:
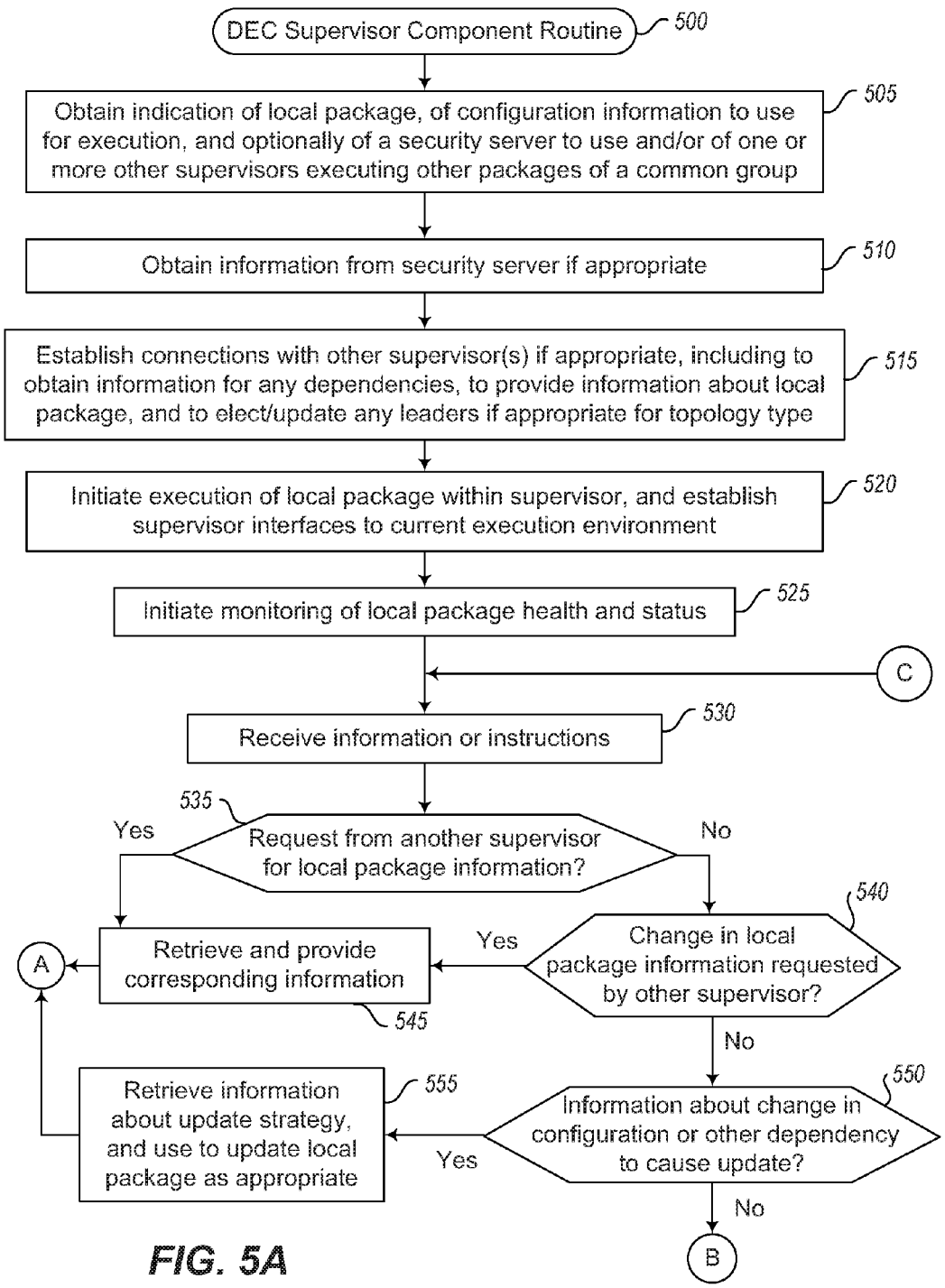
FIGS. 5A-5B illustrate a flow diagram of an example embodiment of a DEC Supervisor Component routine.
Figure 5B:
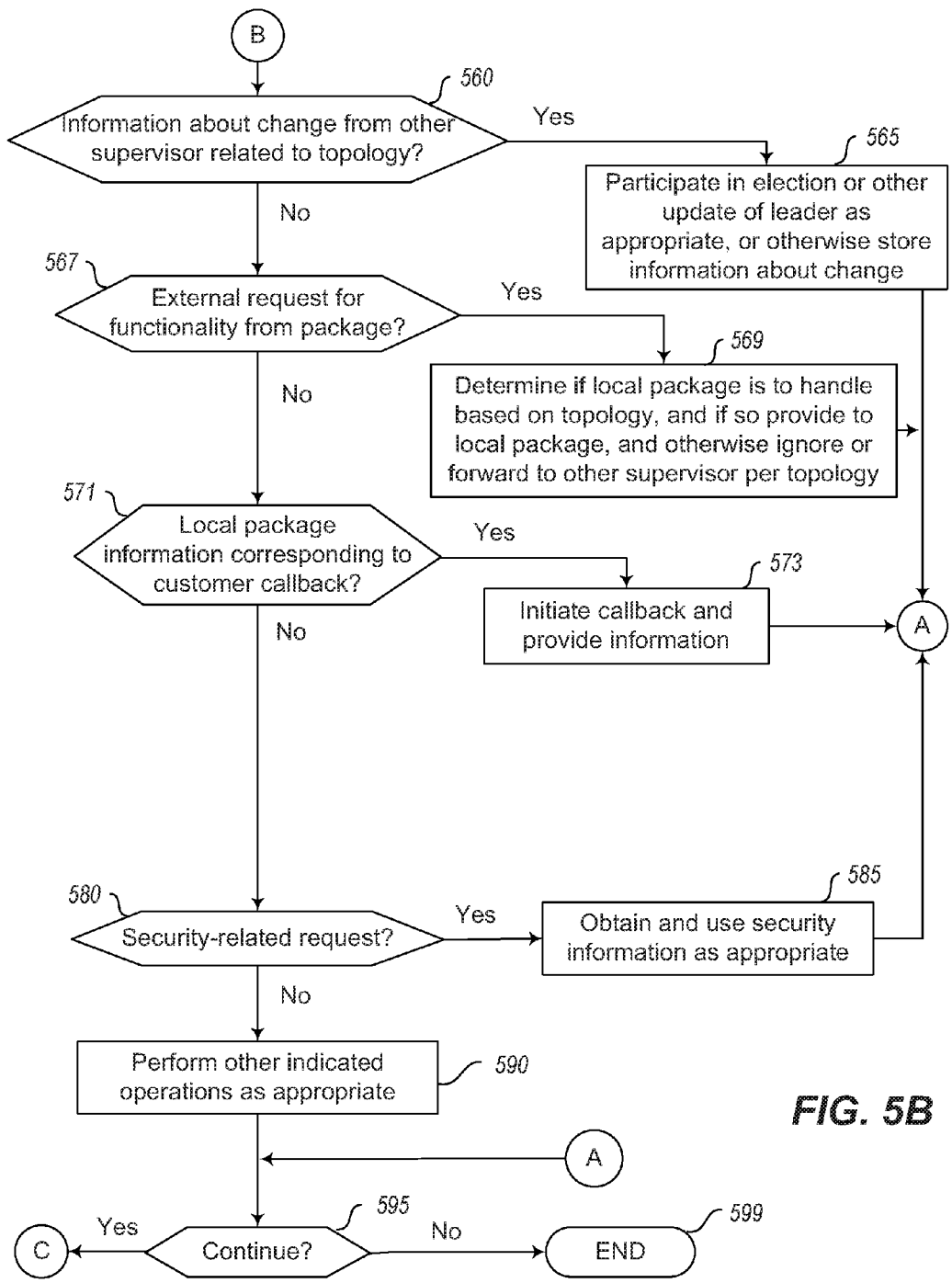

FIGS. 5A-5B illustrate a flow diagram of an example embodiment of a DEC Supervisor Component routine 500. The routine may be provided by, for example, execution of DEC supervisor components 380 of FIG. 3, supervisor components 145 of FIG. 1, and/or supervisor components 287 of FIG. 2B, such as to perform decentralized choreographed distributed execution of a group of inter-related packages or other programs. In the illustrated embodiment, the supervisor component is discussed as being deployed with other related supervisor components (e.g., within a single execution environment), although in other embodiments other configurations may be used (e.g., executing a single supervisor component that is not interacting with any other supervisor components; executing a group of multiple related supervisor components that are in different geographical locations and/or in different execution environments, such as to execute one or more supervisor component in an online program execution service and to execute one or more other of the supervisor components on hardware systems provided by customer; to have one group of related supervisor components interact with one or more other groups of related supervisor components; etc.). In addition, while a single supervisor routine is illustrated in FIGS. 5A-5B, it will be appreciated that multiple instances of the supervisor component routine may simultaneously execute on different computing systems to deploy different instances of a single package and/or to deploy different packages.

In the illustrated embodiment, the routine 500 begins at block 505, where an indication is obtained of a local package being deployed that is to be executed, and optionally of additional related information, including one or more of configuration information to use for the execution, one or more other supervisor components with which to interact as part of choreographed distributed execution of a group of related packages, and/or information about a security server with which to interact to perform security-related operations (e.g., a public key encryption server). After block 505, the routine continues to block 510 to obtain information from the security server, if specified and if needed to initiate the execution of the local package (e.g., a decryption key needed in order to decrypt and access the local package to be executed).

After block 510, the routine continues to block 515 to establish connections with one more other supervisor components if possible, such as based on information received in block 505 about other supervisor components, or instead as may be discoverable by the supervisor component in the current execution environment in other manners. If, for example, the local package has dependencies on one or more other packages or package instances, the supervisor component may attempt to obtain information about any such other package or package instances from the corresponding supervisor components for them. Similarly, if the local package has dependency on one or more configuration files that are stored in a network-accessible location, the supervisor may attempt to obtain information about a current version of the configuration information, such as to verify that changes have not occurred to the configuration information that would result in an update to the local package. In addition, in embodiments and situations in which a topology used by the local package and supervisor have the local package as one of multiple package instances that together provide a specified type of functionality, the operations of the supervisor in block 515 may include electing or otherwise updating information about one or more leaders for the group of multiple package instances or packages that are working together, or otherwise may take related actions for other topology types that are defined for use by the local package supervisor.

After block 515, the routine continues to block 520 where the supervisor component initiates the execution of the local package in the current deployment environment within the executing supervisor component, and establishes interfaces between the supervisor component and the execution environment if not previously done. For example, if the supervisor is executing within a particular type of operating system, the interfaces between the supervisor component and the operating system may be established to allow the supervisor component (and the local package) to access operating system functionality as needed. Similarly, if the supervisor component is executing in a bare metal or bare machine environment, the supervisor component may establish interfaces to connect directly to particular hardware components of an underlying physical computer system in which the supervisor component is executing. When the supervisor component executes within a virtual machine, the supervisor component may in some embodiments execute as any other software program within the virtual machine and establish connections to the operating system provided within the virtual machine, while in other embodiments may establish interfaces directly with a virtual machine manager component that manages the virtual machine.

After block 520, the supervisor component in block 525 initiates monitoring of the local package health and status, such as to use default types of health and status monitoring, and/or to use any customer-specific plugins provided for such functionality.

After block 525, the routine continues to block 530, where it begins to perform a loop from blocks 530 to 590 as part of a choreographed distributed execution of the local package together with any other related supervisor components. In particular, the routine in block 530 receives information or instructions, optionally waiting for such instructions or information before proceeding. In block 535, the routine then determines if a request is received in block 530 that indicates a request from another supervisor component for information about the local package. If so, the routine continues to block 545 to retrieve and provide corresponding information to the other supervisor, such as after determining that the other supervisor is authorized to receive the information (e.g., based on security-related information from the security server, such as an ability to decrypt an encrypted communication that is received), and/or after obtaining and using any security information as configured (e.g., to use an encryption key to encrypt the information before sending out a communication to the other supervisor), including to perform communications over one more intervening networks between the supervisor components. If it is instead determined in block 535 that the Information or instructions at block 530 are not such a request from another supervisor, the routine instead continues to block 540 to determine if an event or other change has occurred with respect to the local package (e.g., based on the monitoring being performed) of a type that has been subscribed to or otherwise requested by another supervisor (e.g., to push information to other supervisor components for which they have previously subscribed). If so, the routine similarly continues to block 545 to retrieve and provide the corresponding information if appropriate to the other supervisor component. After block 545, the routine continues to block 595.

If it is instead determined in block 540 that the information or instructions received in block 530 are not based on a change in local package information, the routine continues instead to block 550 to determine whether information or instructions received in block 530 include information about a change in configuration or other dependency for the local package that results in an update for the local package (e.g., based on the information supplied by another supervisor component from which the current supervisor component has subscribed to such information, based on monitoring a configuration file for the local package, etc.). If so, the routine continues to block 555 to retrieve information about a currently specified update strategy for the local package, and uses that information to update the local package as appropriate. It will be appreciated that such an update may include, for example, shutting down the local package execution, retrieving new configuration information and/or a new package (e.g., a newer version of the previous local package), and Initiating execution of the prior or new package using current configuration information. After block 555, the routine continues to block 595.

If it is instead determined in block 550 that the information or instructions received in block 530 are not information about a change that causes an update for the local package, the routine continues instead to block 560 to determine whether the information or instructions received in block 530 are information from another supervisor component about a change that affects the current topology for the local package. If so, the routine continues to block 565 to participate in an election or other update of a leader, if appropriate, for a group of multiple packages and their supervisors that together provide a specified type of functionality, or to otherwise update information of another type related to the topology (e.g., a new role of the local package within the topology), and to store information about the change. After block 565, the routine continues to block 595.

If it is instead determined in block 560 that the information or instructions received in block 530 are not a change related to the topology, the routine continues instead to block 567 to determine whether the information or other instructions received in block 530 are instead an external request for functionality to be provided from the local package, such as from the customer or other end user that is interacting with the current local package or with a group of multiple related packages (including the local package) that are operating together. If so, the routine continues to block 569 to determine if the local package is to handle the request based on the current topology, and if so, provides the request to the local package for handling, and otherwise ignores the request (e.g., if another supervisor component whose local package is to handle the request will also receive the request) or to forward the request to one or more other supervisors for handling based on the current topology. After block 569, the routine continues to block 595.

If it is instead determined in block 567 that the information or instructions received in block 530 are not an external request for functionality, the routine continues instead to block 571 to determine if information is obtained from the local package corresponding to a defined customer callback, such as based on the monitoring performed or other actions of the local package. If so, the routine continues to block 573 to invoke the one or more related callbacks and to provide corresponding information to the customer. After block 573, the routine continues to block 595.

If it is instead determined in block 571 that the information or instructions received in block 530 are not local package information corresponding to a customer callback, the routine continues instead to block 580 to determine whether a security-related request has been received, such as from a public key encryption server or other security server, or from the local package or from another supervisor with respect to security-related information that is needed. If so, the routine continues to block 585 to obtain and use the security information as appropriate, including to interact with the security server if needed to obtain security information for use. After block 585, the routine continues to block 595.

If it is instead determined in block 580 that the information or instructions received in block 530 are not a security-related request, the routine continues instead to block 590 to optionally perform one or more other indicated operations as appropriate. Non-exclusive examples of such other operations include receiving and handling communications from the local package and other interactions by a local package, managing interactions with the surrounding execution environment (e.g., to respond to events and requests separate from other supervisor components and their local packages), to determine if an update to the supervisor software itself is needed and if so to initiate corresponding operations to update the supervisor program, etc.

After blocks 545, 555, 565, 569, 573, 585 or 590, the routine continues to block 595 to determine whether to continue, such as until an explicit indication to terminate is received (e.g., from the local package, customer, another authorized supervisor component, the DEC system, etc.). If it is determined to continue, the routine returns to block 530 to wait for other information or instructions, as well as to continue performing monitoring as appropriate, and otherwise continues to block 599 and ends.

It will be appreciated that in some embodiments the functionality provided by the routines discussed above may be provided in alternative ways, such as being split among more routines or consolidated into fewer routines. Similarly, in some embodiments, illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, in other embodiments the operations may be performed in other orders and in other manners. Similarly, the data structures discussed above may be structured in different manners in other embodiments, such as by having a single data structure split into multiple data structures or by having multiple data structures consolidated into a single data structure, and may store more or less information than is described (e.g., when other illustrated data structures instead lack or include such information respectively, or when the amount or types of information that is stored is altered).

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A system, comprising:
multiple hardware processors of multiple computer systems; and
one or more memories with stored instructions that, when executed by the multiple hardware processors, cause the multiple computer systems to implement functionality of a plurality of supervisor components that each manages execution of a local software package within the supervisor component and coordinates that managed execution with other supervisor components of the plurality, the managing of the execution by one of the supervisor components including:
determining, by the supervisor component, at least one other software package that is within at least one other supervisor component of the plurality and on which the local software package within the supervisor component has a dependency;
initiating, by the supervisor component, communications with the at least one other supervisor component to monitor information about ongoing execution of the at least one other software package;
executing, within the supervisor component and based at least in part on the monitored information, the local software package;
monitoring, by the supervisor component, ongoing execution of the local software package, and exposing information about the monitored ongoing execution to the other supervisor components; and
updating, by the supervisor component and while one or more other of the supervisor components continue to manage execution of local software packages within the one or more other supervisor components, the local software package within the supervisor component based on a specified predefined update strategy.

2. The system of claim 1 wherein each supervisor component of the plurality is further configured to implement one of multiple predefined update strategies for the local software package within that supervisor component, and wherein the stored instructions further cause the multiple computer systems to implement the functionality of the plurality of supervisor components by, for each of one or more supervisor components of the plurality, updating the local software package within that supervisor component in accordance with the one update strategy configured for that supervisor component.

3. The system of claim 2 wherein the multiple predefined update strategies include a one-at-a-time update strategy in which the plurality of supervisor components perform updates of their local software packages in sequence so that only a single supervisor component is performing an update at any time, a specified subset update strategy in which the plurality of supervisor components perform updates of their local software packages in groups so that no more than a specified subset of the plurality of supervisor components are performing an update at any time, a topology-based update strategy in which the plurality of supervisor components perform updates of their local software packages in an order that is based on roles their local software packages play in one or more defined topologies for the plurality of supervisor components, and a stateless update strategy in which each supervisor component updates its local software package without coordination with any other supervisor components.

4. The system of claim 3 wherein two or more supervisor components of the plurality are configured to implement two or more different update strategies of the multiple predefined update strategies, and wherein the updating of the local software package is performed by each of the two or more supervisor components in different manners based on the two or more different update strategies.

5. The system of claim 1 wherein each supervisor component of the plurality is further configured to implement one of multiple predefined topology types for the local software package within that supervisor component, and wherein the stored instructions further cause the multiple computer systems to implement the functionality of the plurality of supervisor components by, for each of at least some supervisor components of the plurality, controlling interactions with other supervisor components of the plurality based on the one topology type configured for that supervisor component.

6. The system of claim 5 wherein the multiple predefined topology types include a leader-follower topology in which a group of multiple supervisor components of the plurality manages interactions for the group based at least in part on roles that include at least one supervisor component in the group acting as a leader for the group and that include at least one other supervisor component in the group acting as a follower for the group, and a stand-alone topology in which each supervisor component manages operations of its local software package without coordination with any other supervisor components.

7. The system of claim 6 wherein two or more supervisor components of the plurality are configured to be part of a group implementing the leader-follower topology, and wherein the controlling by the two or more supervisor components of the interactions with other supervisor components of the plurality includes electing the local software package of at least one supervisor component of the group as a leader for the group and further includes designating the local software package of at least one other supervisor component of the group as a follower for the group.

8. The system of claim 7 wherein the group includes three or more supervisor components of the plurality, and wherein the controlling by the three or more supervisor components of the interactions with other supervisor components of the plurality further includes, after a previously elected leader for the group becomes unavailable, electing another local software package of a different supervisor component of the group as a new leader for the group.

9. The system of claim 7 wherein the controlling by the two or more supervisor components of the interactions with other supervisor components of the plurality further includes, in response to a request received for functionality from the group, selecting the local software package of one of the two or more supervisor components to respond to the request based at least in part on a role of the selected local software package in the leader-follower topology.

10. The system of claim 1 further comprising one or more builder components that, when executed by one or more of the multiple hardware processors, cause the one or more processors to, before the managing of the execution of the local software package by each of the supervisor components of the plurality, generate multiple software packages that are used as the local software packages of the plurality of supervisor components, the generating of each of the multiple software packages including:
receiving instructions from a customer that specify one or more software applications to include in the software package to be generated and that specify configuration information to use during execution of the one or more software applications; and
generating the software package to include the specified one or more software applications and the specified configuration information and to interact with one or more interfaces of a supervisor component during the execution of the one or more software applications.

11. The system of claim 10 wherein the generating of one of the multiple software packages further includes:
providing, to the customer, information about multiple predefined update strategies that are available for use; and
receiving, from the customer, information about one of the multiple predefined update strategies that is selected by the customer for use with the one software package; and
storing information about the selected predefined update strategy as part of the generated one software package, and wherein managing of execution of the generated one software package by each of one or more of the plurality of supervisor components further includes using the stored information to implement the selected predefined update strategy during the execution of the generated one software package.

12. The system of claim 10 wherein the generating of one of the multiple software packages further includes:
providing, to the customer, information about multiple predefined topology types that are available for use; and
receiving, from the customer, information about one of the multiple predefined topology types that is selected by the customer for use with the one software package; and
storing information about the selected predefined topology type as part of the generated one software package, and wherein managing of execution of the generated one software package by each of one or more of the plurality of supervisor components further includes using the stored information to implement the selected predefined topology type during the execution of the generated one software package.

13. The system of claim 10 wherein the generating of one of the multiple software packages further includes:
providing, to the customer, information about multiple predefined security policies that are available for use; and
receiving, from the customer, information about one of the multiple predefined security policies that is selected by the customer for use with the one software package; and
storing information about the selected predefined security policy as part of the generated one software package, and wherein managing of execution of the generated one software package by each of one or more of the plurality of supervisor components further includes using the stored information to implement the selected predefined security policy during the execution of the generated one software package.

14. The system of claim 10 wherein the one or more software applications specified for one of the multiple software packages include a new software application designed to execute within a supervisor component, and wherein the one or more software applications specified for another of the multiple software packages include a legacy software application that is not designed to execute within a supervisor component.

15. The system of claim 1 wherein the managing of the execution of the one supervisor component further includes monitoring stored configuration information associated with the local software package for the one supervisor component, and, in response to a change in the stored configuration information that is identified from the monitoring, modifying further execution of the local software package to use the changed configuration information.

16. The system of claim 1 wherein the managing of the execution of the one supervisor component further includes using information, which is provided with the local software package for the one supervisor component and is about at least one other supervisor component of the plurality, to establish contact with the at least one other supervisor component and to obtain information about other supervisor components of the plurality, and wherein the monitoring by the one supervisor component of the information about at least one other software package is based at least in part on the obtained information about the other supervisor components.

17. The system of claim 1 wherein the managing of the execution of the one supervisor component further includes:
receiving information from a security server for use in performing security operations that include at least one of encryption and decryption; and
using the received information to perform the security operations as part of at least one of decrypting an encrypted version of the local software package for the one supervisor component before the execution of that local software package, encrypting communications sent from the one supervisor component to one or more other supervisor components, decrypting communications received by the one supervisor component from one or more other supervisor components, or decrypting stored data for use by the executing local software package of the one supervisor component.

18. The system of claim 1 wherein the managing of the execution of the one supervisor component further includes:
using stored information associated with the local software package for the one supervisor component to identify a predefined callback function that is associated with one or more specified criteria and is specified by a customer; and
in response to satisfaction of the one or more specified criteria during the execution of the local software package, providing information to the customer about the execution of the local software package that is related to the callback function, wherein the callback function corresponds to at least one of health information about a problem during the execution of the local software package, a start of the execution of the local software package, a restart of the execution of the local software package, or a change in configuration used during the execution of the local software package.

19. The system of claim 1 wherein the local software package for the one supervisor component is supplied by a customer, and wherein the managing of the execution of the one supervisor component further includes:
using stored information associated with the local software package for the one supervisor component that includes additional customer-specified software to use in monitoring execution of the local software package for the one supervisor component; and
using information from the additional customer-specified software during the monitored execution of the local software package as part of further execution of the local software package.

20. The system of claim 1 wherein the plurality of supervisor components are inter-connected in a mesh structure in which at least one supervisor component of the plurality is connected to at least one other supervisor component of the plurality only indirectly via at least one further intermediate supervisor component of the plurality, and wherein the initiating communications is performed by each of the plurality of supervisor components with at least one other supervisor component using a gossip protocol and the mesh structure.

21. The system of claim 1 wherein communications between the plurality of supervisor components includes using a publish-subscribe model, wherein the initiating communications is performed by each of the plurality of supervisor components with at least one other supervisor component to monitor information about at least one other software package and includes subscribing to information from the at least one other supervisor component, and wherein the exposing of the information is performed by each of the plurality of supervisor components to other supervisor components and includes publishing the information to be exposed.

22. The system of claim 1 further comprising an additional supervisor component that, when executed by at least one of the multiple hardware processors, causes that at least one processor to manage execution of one or more first local software packages within the additional supervisor component by:
initiating communications with one or more other supervisor components of the plurality to monitor information about one or more local software packages of the one or more other supervisor components, without exposing information about the one or more first local software packages of the additional supervisor component to any other supervisor components of the plurality; or
exposing information about the one or more first local software packages of the additional supervisor component to other supervisor components of the plurality, without performing communications with any other supervisor components of the plurality to monitor information about any local software packages of the other supervisor components.

23. The system of claim 1 wherein the plurality of software components are configured to operate within multiple different execution environments that include one or more online program execution environments, one or more types of virtual machines, one or more types of virtualized containers, and one or more types of bare metal computer hardware systems, and wherein at least two supervisor components of the plurality perform the managing of the execution of their local software packages by operating within at least two different execution environments of the multiple different execution environments.

24. A non-transitory computer-readable medium having stored contents that configure one or more computing systems to perform a method, the method comprising:
executing, by the one or more computing systems, multiple supervisor components in a coordinated manner to perform decentralized distributed execution of a plurality of inter-related software packages, wherein each of the supervisor components manages execution of one or more local software packages of the plurality within the supervisor component; and
for each of the executing multiple supervisor components,
determining, by the executing supervisor component, configuration information for use in the local execution of the one or more local software packages within the supervisor component, wherein the configuration information indicates one of multiple predefined types of topologies to use in managing first interactions between the multiple supervisor components, and further indicates one of multiple predefined types of update strategies to use in managing second interactions between the multiple supervisor components as part of updating at least one of the one or more local software packages for the supervisor component during the executing of the multiple supervisor components; and
executing, by the executing supervisor component and based at least in part on the determined configuration information, the one or more local software packages within the supervisor component, the executing including performing the first and second interactions and further including updating, while the decentralized distributed execution continues for at least some of the multiple supervisor components other than the supervisor component, at least one of the one or more local software packages within the supervisor component based on the indicated one predefined type of update strategy for the supervisor component.

25. The non-transitory computer-readable medium of claim 24 wherein the stored contents include software instructions that, when executed, further configure at least one computing system to, before the executing of the multiple supervisor components, generate one or more software packages that are the one or more local software packages for at least one of the multiple supervisor components by:
presenting, by a builder component executing on the at least one computing system, information to a customer about the multiple predefined types of update strategies, and receiving information from the customer about a selection of one predefined type of update strategy for use with the one or more software packages;

presenting, by the builder component, additional information to the customer about the multiple predefined types of topologies, and receiving information from the customer about a selection of one predefined type of topology for use with the one or more software packages; and storing information about the selected one predefined type of update strategy and about the selected one predefined type of topology as part of the generated one or more software packages.

26. The non-transitory computer-readable medium of claim 24 wherein the one or more computing systems include multiple computing systems, wherein the multiple predefined types of topologies include a leader-follower topology in which the multiple supervisor components are part of a group and in which interactions for the group are managed based at least in part on roles that include at least one supervisor component in the group acting as a leader for the group and that include at least one other supervisor component in the group acting as a follower for the group, and a stand-alone topology in which each supervisor component manages operations of its one or more local software packages without coordination with any other supervisor components, and wherein the multiple predefined types of update strategies include a one-at-a-time update strategy in which the multiple supervisor components perform updates of their local software packages in sequence so that only a single supervisor component is performing an update at any time, a specified subset update strategy in which the multiple supervisor components perform updates of their local software packages in groups so that no more than a specified subset of the multiple supervisor components are performing an update at any time, a topology-based update strategy in which the multiple supervisor components perform updates of their local software packages in an order that is based on roles that those local software packages play in one or more defined topologies for the multiple supervisor components, and a stateless update strategy in which each supervisor component updates its one or more local software packages without coordination with any other supervisor components.

* * * * *